United States Patent [19]
Meeker

[11] 3,863,132
[45] Jan. 28, 1975

[54] EFFICIENT DC/DC CONVERTER FOR A SOLID STATE FUZE

[75] Inventor: George William Meeker, Silver Spring, Md.

[73] Assignee: The United States of America as represented by the Secretary of the Navy, Washington, D.C.

[22] Filed: Nov. 19, 1973

[21] Appl. No.: 416,912

[52] U.S. Cl. ............ 321/2, 102/70.2 R, 323/DIG. 1
[51] Int. Cl. ............................................. H02m 3/14
[58] Field of Search ............... 320/1; 307/108, 109; 321/2, 15, 45 R; 323/DIG. 1; 89/1.814; 102/70.2 R

[56] References Cited
UNITED STATES PATENTS

| | | | |
|---|---|---|---|
| 3,439,251 | 4/1969 | Schaefer | 321/2 |
| 3,454,860 | 7/1969 | Burkett et al. | 317/33 SC |
| 3,497,792 | 2/1970 | Mlynar | 320/1 |
| 3,721,886 | 3/1973 | Phinney et al. | 320/1 |
| 3,728,935 | 4/1973 | Magorian | 89/1.814 |
| 3,732,823 | 5/1973 | Held et al. | 102/70.2 R |

FOREIGN PATENTS OR APPLICATIONS

| | | | |
|---|---|---|---|
| 1,281,011 | 9/1965 | Germany | 321/15 |
| 2,050,359 | 5/1971 | Germany | 323/DIG. 1 |

*Primary Examiner*—William H. Beha, Jr.
*Attorney, Agent, or Firm*—R. S. Sciascia; J. A. Cooke; W. W. Cochran

[57] ABSTRACT

A DC/DC converter for transforming a high voltage to a lower voltage level for use in a solid state electrical time fuze. It comprises a constant charging network to charge a capacitor, which when charged, closes a switch in a series resonant circuit until a second switch closes forming a second resonant circuit.

1 Claim, 2 Drawing Figures

EFFICIENT DC/DC CONVERTER FOR A SOLID STATE FUZE

BACKGROUND OF THE INVENTION

The present invention relates generally to electrical conversion systems and more specifically to DC to DC converters for use with solid state time fuses.

For safety purposes, the method currently used to actuate the fuses of bombs carried by planes is to effect an electrical connection between the bomb fuse and the plane's electrical system after the bomb has been released and is in the process of falling away from the plane. Since the electrical connection is made for only a short period of time ($10^{-2}$ sec), only a predetermined amount of energy is transferred to the fuse at voltage levels ranging from 200 to 300 volts corresponding to the aircraft's electrical output voltage. Since the previous resistor-capacitor and gas diode fuses directly used energy at these higher voltage levels, conversion to lower voltage levels was unnecessary. However, these prior art fuses have various disadvantages which make the use of solid state fuses more advantageous. For example, the timing accuracy of the prior fuses is much less than that obtainable by solid state. Also, there is virtually no method of testing the prior fuses before operation to check reliability. In addition, the solid state fuse can be made more compact using modern integrated circuit techniques at a much lower cost than the conventional resistor-capacitor gas diode fuses since integrated circuits readily lend themselves to mass production techniques.

Certain problems have arisen however in converting the high voltage energy to a lower voltage so that the solid state circuitry can be used. As previously mentioned, only a predetermined amount of energy is transferred to the fuses in a time period of approximately $10^{-2}$ sec.

The efficiency of a converter in transforming this energy is important since the charged capacitors which store the energy for the fuse cannot, under the worst case, supply much more power than is actually needed. This rules out the use of inefficient type converters such as the series resistor, capacitor type which dissipates a large part of the supplied energy in a load resistor. In fact, because of the large stepdown in voltage, from 200 to 300 volts down to 10 to 15 volts at microwatt levels, prior circuitry has approached reasonable efficiency only with expensive and bulky components. For example, a switching regulator conversion design which is employed widely in DC to DC converters has been found very difficult to impliment since the current ranges from 1 to 200 microamps. Various expensive and bulky components have been found to be necessary to supply these current ranges and still not deliver the required efficiency.

SUMMARY OF THE INVENTION

The present invention overcomes the disadvantages and limitations of the prior art by providing a simple and efficient DC to DC converter for a solid state fuse. A bank of capacitors are used to store energy at a high voltage level which in turn charges a first capacitor in the converter circuit. When the voltage has built up to a predetermined level on the first circuit capacitor a first switch closes to apply the charge on the first circuit capacitor to a series resonant circuit comprising a second capacitor and an inductor.

Subsequently, the voltage level on the first circuit capacitor is transferred to the inductor and the second capacitor. When the voltage level on the first circuit capacitor reaches zero, it is disconnected from the resonant circuit and a second switch forms a resonant circuit comprising the inductor and the second capacitor. The result is that the entire energy is transferred from the first capacitor to the inductor and second capacitor at a different voltage level controlled by the relative values the first and second capacitors.

It is threfore the object of the present invention to provide an improved DC to DC converter.

It is also the object of the present invention to provide a DC to DC converter which is simple and reliable.

Another object of the invention is to provide a DC to DC converter which can efficiently convert high voltages to low voltages.

Another object of the present invention is to provide a DC to DC converter which is inexpensive and easy to manufacture.

Another object of the invention is to provide a DC to DC converter which is compact.

Other objects, advantages and novel features of the invention will become apparent from the following detailed description of the invention when considered in conjunction with the accompanying drawings wherein:

DETAILED DESCRIPTION OF THE PREFERRED EMBODIMENTS

Figure 1:
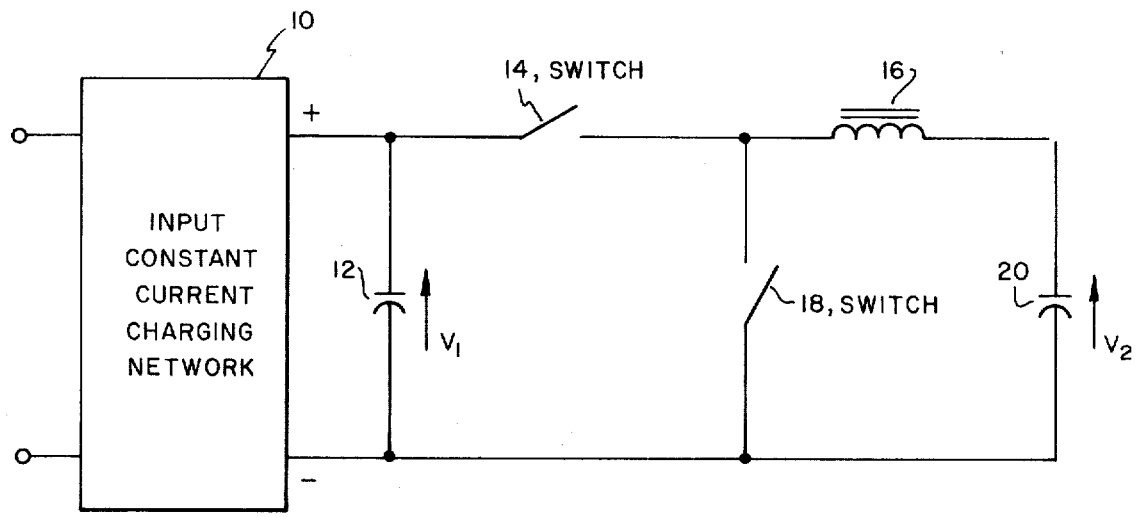
FIG. 1 is a block diagram of the converter comprising the preferred embodiment.

FIG. 1 is an idealized quasi-block diagram of the present invention.

As shown, the energy is first introduced to the fuse by a constant charging network 10. The energy is stored as charge on capacitor 12. When the voltage on 12 reaches a predetermined value—160 volts for this design, switch 14 closes. Switch 18 remains open and there has previously been no voltage on capacitor 20 or any current in inductor 16. It will be assumed that the input network no longer supplies constant current but this assumption is only for explanation purposes at this point. In practice it is not necessary to disable it at the time of switch 14 closure.

Capacitor 12, switch 14, inductor 16 and capacitor 20 form a series resonant circuit. Current commences flowing in a clockwise direction until the time at which the voltage on capacitor 12 is 0 volts. At this moment, switch 14 is opened and switch 18 is closed. The energy originally stored on capacitor 12 ($C_{12}$) is now all converted, and some dissipated in the non-idealized parts to be described later, to energy both in the inductor 16 and the capacitor 20 ($C_2$). The energy on capacitor 20 ($E_{c_{20}}$) to be derived later is $$E_{c_{20}} = \tfrac{1}{2} C_{20} V_2^2,$$

where $$V_2 = V_1(C_{12}/C_{20})$$

Therefore, $$E_{c_{20}} = \tfrac{1}{2} C_{12} V_1^2 (C_{12}/C_{20}$$

at this time. If the ratio of capacitors is fairly high, most of the energy will be in the magnetic field of the inductor and relatively little in capacitor 20. The energy in the inductor 16 is ideally then:

$$E_2 = \tfrac{1}{2} C_{12}V_1^2 - \tfrac{1}{2} C_{12}V_1^2 \, C_{12}/C_{20}$$

$$E_2 = \tfrac{1}{2} C_{12}V_1^2 \, [1 - C_{12}/C_{20}] = \tfrac{1}{2} C_{12}V_1^2 \, [C_{20} \, C_{12}/C_{20}]$$

Swith 18 is closed to permit the new series circuit made up of switch 18, inductor 16, and capacitor 20 to resonate and the current built up in inductor 16 to continue to flow. Switch 18 remains closed until the current flowing in a clockwise direction falls to zero. At this point, switch 18 opens and all of the energy stored in the magnetic field of the coil is delivered to capacitor 20. In the ideal case, all of the energy originally stored on capacitor 12 is now stored on capacitor 20

$$\tfrac{1}{2} C_{12}V_1^2 = (\tfrac{1}{2}) \, c_{20}V_2^2$$

and the voltage on $C_{20}$ is now $$V_2 = V_1 \, (C_{12}/C_{20})$$

$C_{12}$ and $C_{20}$ can be chosen to yield the needed output energy and voltage.

Figure 2:
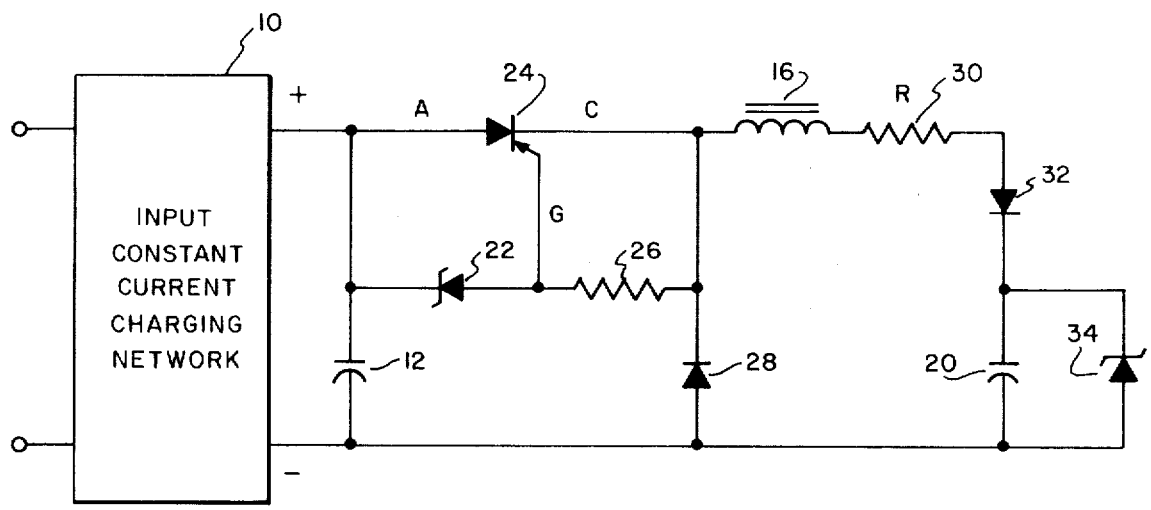
FIG. 2 is a circuit diagram of the converter comprising the preferred embodiment.

FIG. 2 shows the circuitry with the components necessary to implement the switching required. When the voltage on capacitor 12 reaches the value necessary for the zener diode 22 to conduct, current from the input charging network also flows into the gate of the silicon controlled rectifier 24. SCR 24 turns on and serves now as the closed switch 14. As before mentioned, it is now assumed that the input network ceases to provide input current. In practice input current continues to flow somewhat longer. However, the assumption that it ceases at this point is useful as a worst case condition of getting all of the required energy into the converter.

When the voltage on capacitor 12 is reduced to zero, SCR 24 stops conducting. This corresponds to roughly one quarter of a cycle of resonant oscillation, the frequency of which is determined approximately by, $$f_r = 1/2 \pi \sqrt{LC_s}$$

where $$C_s = C_{12} \, C_{20}/C_{12} + C_{20}.$$

The time required is then $$T_1 = 1/4 \, f_r = \pi \, \sqrt{LC_s/2}.$$

At this time a new series resonant circuit formed by inductor 16, resistance 30 inherent in inductor 16, capacitor 20, diode 28 and diode 32 conducts current. A motivating voltage to provide current flowing in a clockwise fashion is supplied by the inductor due to $$L = (d\,i/d\,t).$$

Energy leaves the inductor 16 as the current decreases but reappears as increased voltage on capacitor 20. All energy is gone from the inductor when the current is reduced to zero. Voltage on capacitor 20 is held there as current is inhibited from flowing in the opposite direction by diode 28 and diode 32. Diode 32 and other isolating diodes are, in practice, only needed when several capacitors adding up to the total capacitance represented by capacitor 20 need to be separately charged up to $V_2$ as is the case with the fuse application. Zener diode 34 is included in practice to limit the voltage developed on capacitor 20 to the value of the zener breakdown voltage of zener diode 34. This aspect is useful to avoid placing tight tolerances on other components of the converter to achieve exactly the desired voltage on capacitor 20. The converter is therefore designed to provide at least enough voltage on capacitor 20 to reach the zener voltage. Any attempt to provide greater voltage will result in the excess energy being dissipated in zener diode 34.

The efficiency of the converter in the ideal case is 100 percent if we define the efficiency as the ratio of energy appearing on capacitor 20 after operation to that appearing on capacitor 12 just prior to operation.

The efficiency of energy transfer from capacitor 12 to capacitor 20 and the resulting voltage on capacitor 20 can be approximately determined for the non-ideal case wherein the resistance 30 of the coil is considered. This analysis shows the importance of the inductance and resistance in determining the conversion efficiency once capacitor 12 and capacitor 20 have been chosen.

The primary advantage of the present invention is that it allows the improvements offered by solid state electronics to be used in a bomb fuse which contains no internal stored energy such as a battery for the first time.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. An electrical conversion system for converting a quantum of energy at a predetermined D.C. voltage level supplied by an aircraft electrical system to a lower D.C. voltage level with a minimum of loss to activate the fuze circuit of a bomb comprising:

a first capacitor connected between the positive and negative terminals of an input charging network;
  a first zener diode having an anode and a cathode wherein said cathode of said first zener diode is connected to said positive terminal of said input charging network;
  a silicon controlled rectifier having an anode, a cathode and a gate wherein said anode of said silicon controlled rectifier is connected to said positive terminal of said input charging network and said gate is connected to said anode of said first zener diode;
  a first diode having a cathode and an anode wherein said anode of said first diode is connected to said negative terminal of said input charging network and said cathode is said first diode is connected to said cathode of said silicon controlled rectifier;
  a resistor connected between said gate of said silicon controlled rectifier and said cathode of said first diode means;
  an inductor having first and second terminals wherein said first terminal is connected to said cathode of said silicon controlled rectifier;
  a second diode having an anode and a cathode wherein said anode of said second diode is connected to said second terminal of said inductor;
  a second zener diode having an anode and a cathode wherein said anode of said second zener diode is connected to said negative terminal of said input charging network and said cathode of said second zener diode is connected to said cathode of said second diode;
  a second capacitor connected between said anode and said cathode of said second zener diode;
  wherein a lower voltage is developed across said second capacitor in comparison to voltage developed across said first capacitor during a single switching action of said silicon controlled rectifier.

* * * * *